(12) United States Patent
Beddingfield

(10) Patent No.: US 10,765,058 B1
(45) Date of Patent: Sep. 8, 2020

(54) PITCHFORK TINE REPLACEMENT APPARATUS

(71) Applicant: Archie Beddingfield, Maple Valley, WA (US)

(72) Inventor: Archie Beddingfield, Maple Valley, WA (US)

( * ) Notice: Subject to any disclaimer, the term of this patent is extended or adjusted under 35 U.S.C. 154(b) by 0 days.

(21) Appl. No.: 16/582,560

(22) Filed: Sep. 25, 2019

(51) Int. Cl.
*A01D 7/06* (2006.01)
*A01D 9/04* (2006.01)

(52) U.S. Cl.
CPC ...... *A01D 7/06* (2013.01); *A01D 9/04* (2013.01)

(58) Field of Classification Search
CPC .... A01D 9/02; A01D 9/04; A01D 7/06; A01D 7/00; A01D 11/06; A01B 1/04
USPC ............. 294/55.5, 400.04, 400.16, 400.21
See application file for complete search history.

(56) References Cited

U.S. PATENT DOCUMENTS

| | | | |
|---|---|---|---|
| 1,430,369 A * | 9/1922 | Funk | A01D 9/00 294/55.5 |
| 1,456,455 A | 5/1923 | Luukkonen | |
| 2,587,424 A * | 2/1952 | Zeman | A01D 7/06 56/400.17 |
| 3,781,053 A * | 12/1973 | Wicks | A01D 9/00 294/55.5 |
| 4,215,528 A | 8/1980 | Fodor | |
| 5,033,261 A | 7/1991 | Bonnes | |
| 6,131,381 A * | 10/2000 | Milbury | A01B 1/24 172/371 |
| 6,427,431 B1 | 8/2002 | Hsu | |
| 6,474,056 B1 | 11/2002 | Hsu | |
| 7,000,564 B2 * | 2/2006 | Franczyk | A21C 15/002 118/13 |
| 8,172,287 B1 | 5/2012 | Watson | |
| 9,215,842 B2 | 12/2015 | Chrostowski | |
| D782,889 S | 4/2017 | Andrades | |

* cited by examiner

*Primary Examiner* — Stephen A Vu

(57) ABSTRACT

A pitchfork tine replacement apparatus for replacing a broken pitchfork tine includes a semi-tubular base configured to selectively engage a tine crossbar of a pitchfork. The base has a set of tine apertures extending therethrough. At least one tine sleeve is coupled to the base. Each tine sleeve is hollow and is coupled to an outer face of the base around one of the tine apertures. Each tine sleeve is configured to receive one of a plurality of pitchfork tines coupled to the tine crossbar of the pitchfork. A tine spike has a hollow base portion coupled to the outer face of the base around one of the tine apertures and a solid spike portion extending from the base portion. The base portion is configured to receive a remnant of a broken tine of the plurality of pitchfork tines.

8 Claims, 6 Drawing Sheets

PITCHFORK TINE REPLACEMENT APPARATUS

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to landscaping tool devices and more particularly pertains to a new landscaping tool device for replacing a broken pitchfork tine.

(2) Description of Related Art Including Information Disclosed Under 37 CFR 1.97 and 1.98

The prior art relates to landscaping tool devices.

BRIEF SUMMARY OF THE INVENTION

An embodiment of the disclosure meets the needs presented above by generally comprising a semi-tubular base configured to selectively engage a tine crossbar of a pitchfork. The base has a set of tine apertures extending therethrough. At least one tine sleeve is coupled to the base. Each tine sleeve is hollow and is coupled to an outer face of the base around one of the tine apertures. Each tine sleeve is configured to receive one of a plurality of pitchfork tines coupled to the tine crossbar of the pitchfork. A tine spike has a hollow base portion coupled to the outer face of the base around one of the tine apertures and a solid spike portion extending from the base portion. The base portion is configured to receive a remnant of a broken tine of the plurality of pitchfork tines.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
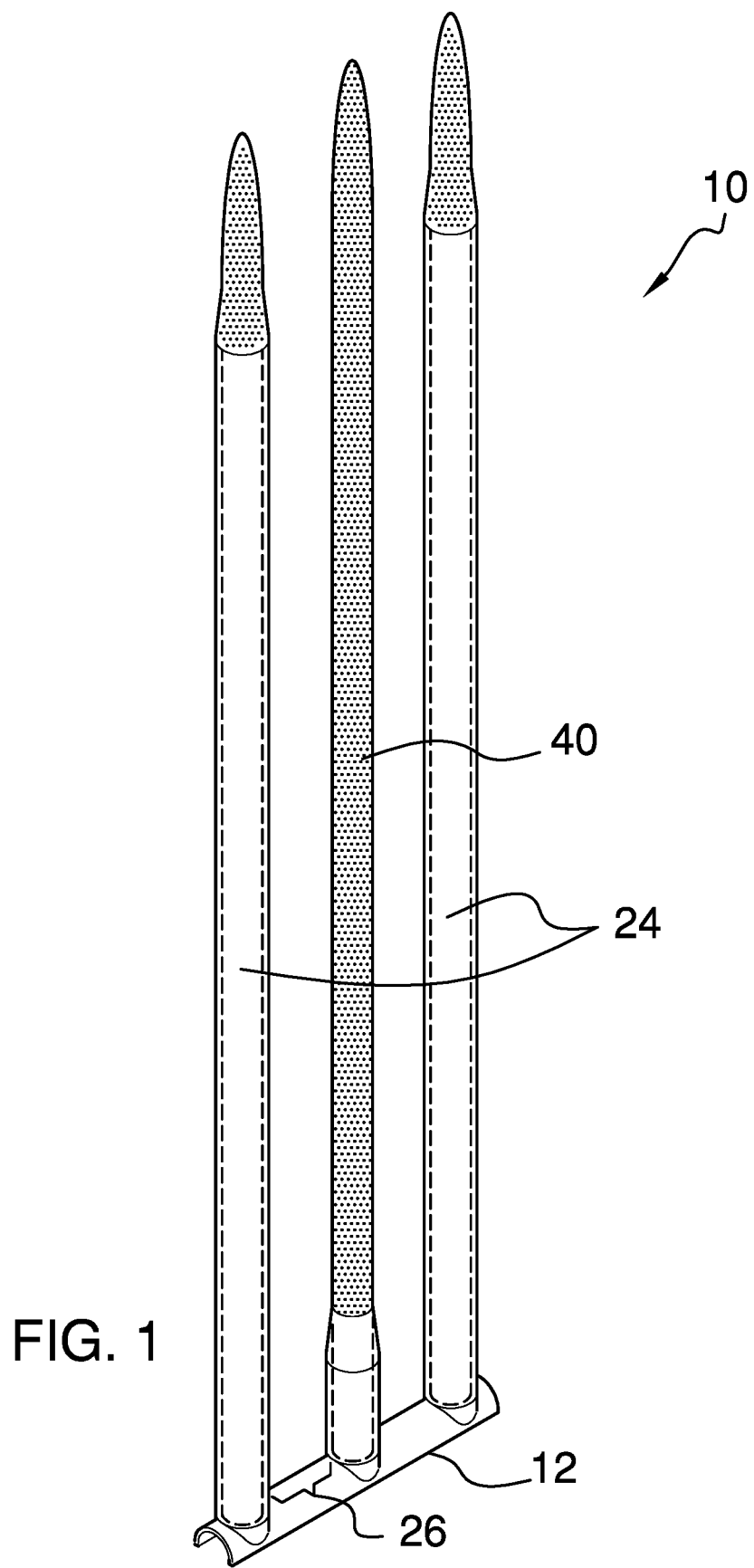
FIG. 1 is an isometric view of a pitchfork tine replacement apparatus according to an embodiment of the disclosure.
Figure 2:
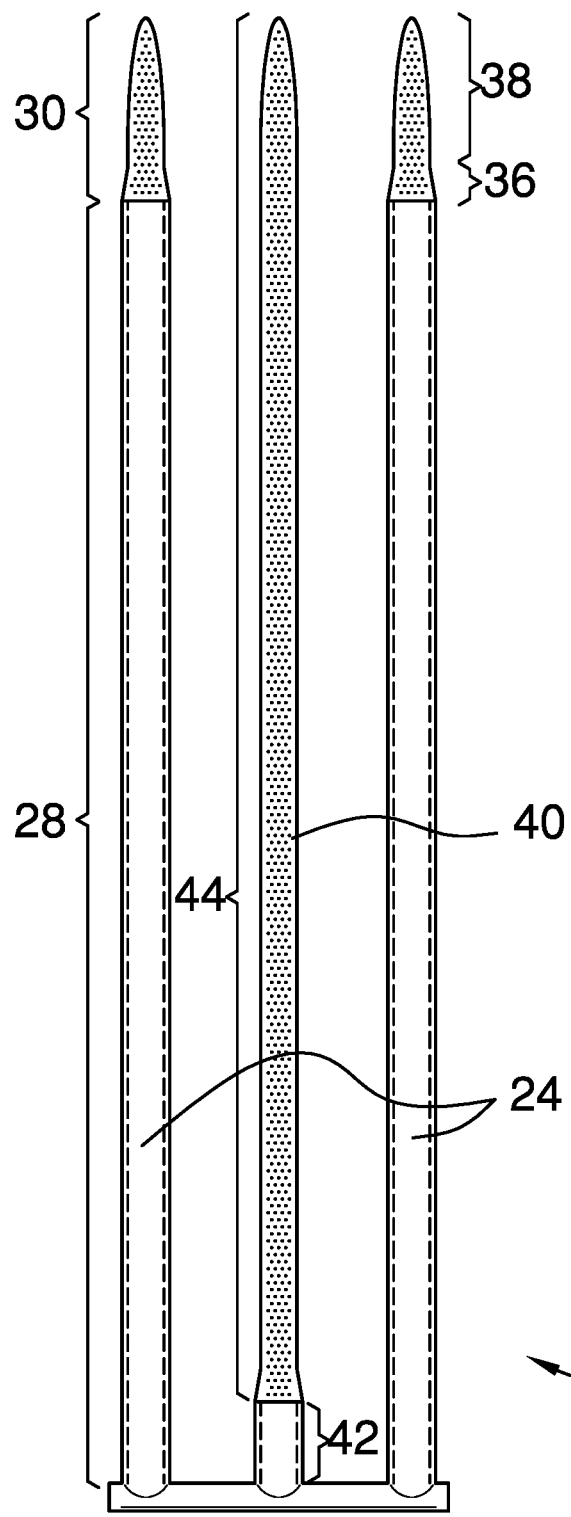
FIG. 2 is a front elevation view of an embodiment of the disclosure.
Figure 3:
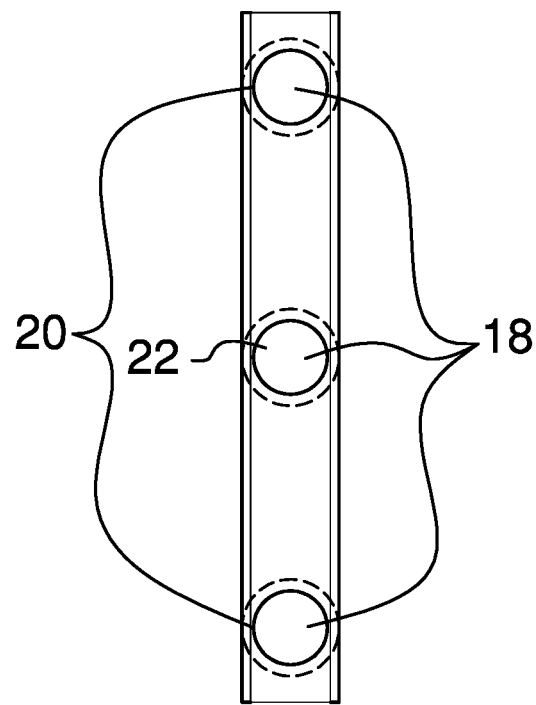
FIG. 3 is a bottom plan view of an embodiment of the disclosure.
Figure 4:
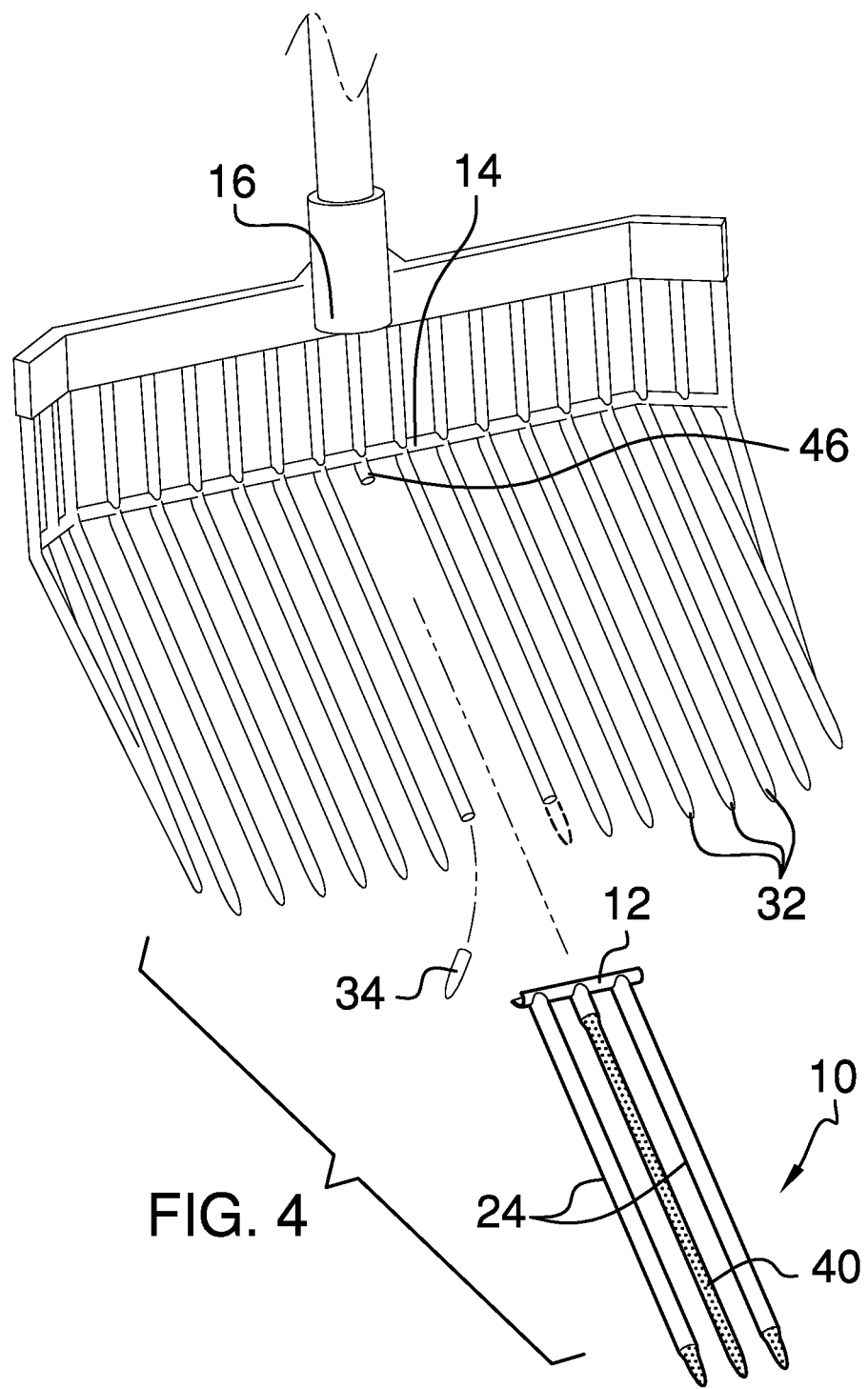
FIG. 4 is an in-use view of an embodiment of the disclosure.
Figure 5:
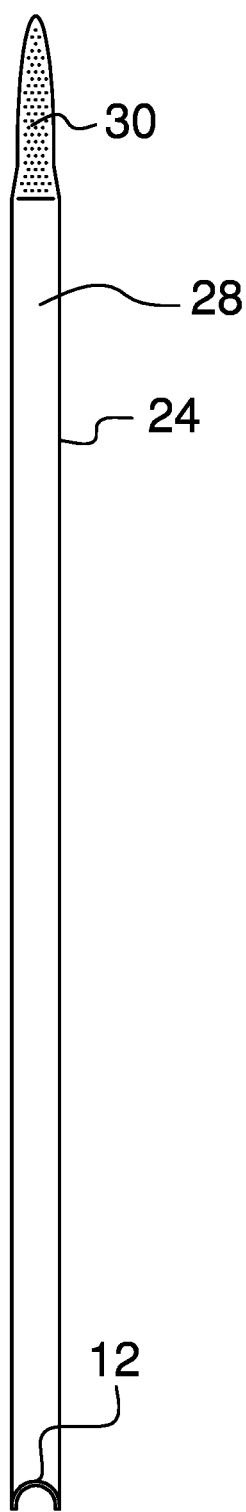
FIG. 5 is a side elevation view of an embodiment of the disclosure.

With reference now to the drawings, and in particular to FIGS. 1 through 7 thereof, a new landscaping tool device embodying the principles and concepts of an embodiment of the disclosure and generally designated by the reference numeral 10 will be described.

As best illustrated in FIGS. 1 through 7, the pitchfork tine replacement apparatus 10 generally comprises a semi-tubular base 12 configured to selectively engage a tine crossbar 14 of a pitchfork 16. The base 12 has a set of tine apertures 18 extending therethrough. The set of tine aperture 18 may be three evenly spaced tine apertures 18 comprising a pair of outer tine apertures 20 and a medial tine aperture 22.

At least one tine sleeve 24 is coupled to the base 12. Each tine sleeve 24 is hollow and coupled to an outer face 26 of the base around one of the tine apertures 18. Each tine sleeve 24 has a hollow body portion 28 and a solid tip portion 30. The hollow body portion 28 is configured to receive one of a plurality of pitchfork tines 32 coupled to the tine crossbar 14 of the pitchfork once an end segment 34 of the pitchfork tine has been cut off. This allows the pitchfork tine 32 to fully occupy the body portion 28 for maximal support while allowing the tip portion 30 to be solid and thus less prone to breaking. The tip portion 30 may have a tapered neck section 36 and a pointed head section 38 to allow it to match a diameter of the pitchfork tines 32. The tine sleeves 24 may be a pair of tine sleeves 24 coupled around the pair of outer tine apertures 20 of the set of tine apertures 18.

A tine spike 40 is coupled to the base 12. The tine spike 40 has a hollow base portion 42 and a solid spike portion 44 extending from the base portion 42. The hollow base portion 42 may be wider than the solid spike portion 44 to allow the solid spike portion 44 to match the diameter of the pitchfork tines 32. The base portion 42 is coupled to the outer face 26 of the base between the pair of tine sleeves 24 around the medial tine aperture 22 of the set of tine apertures. The base portion 42 is configured to receive a remnant of a broken tine 46 of the plurality of pitchfork tines.

Figure 6:
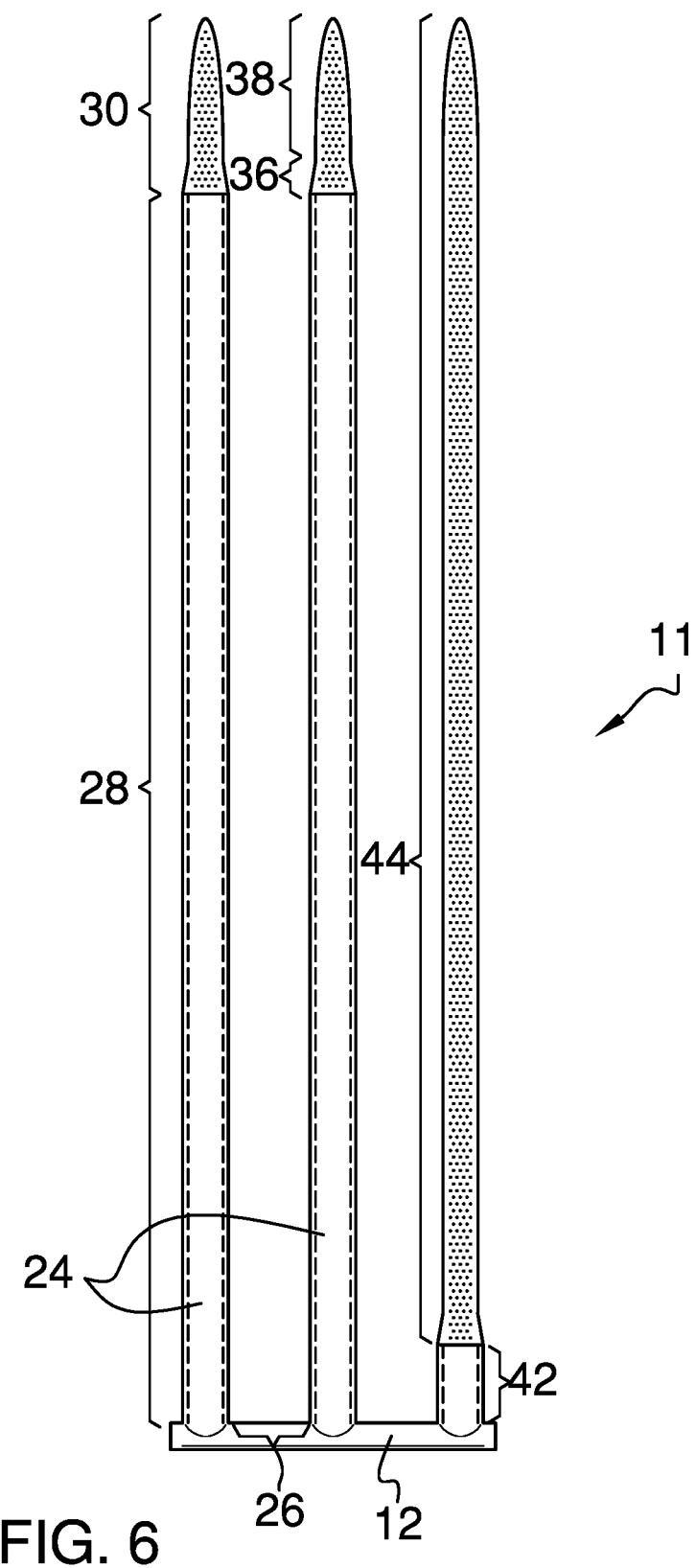
FIG. 6 is a front elevation view of an embodiment of the disclosure.
Figure 7:
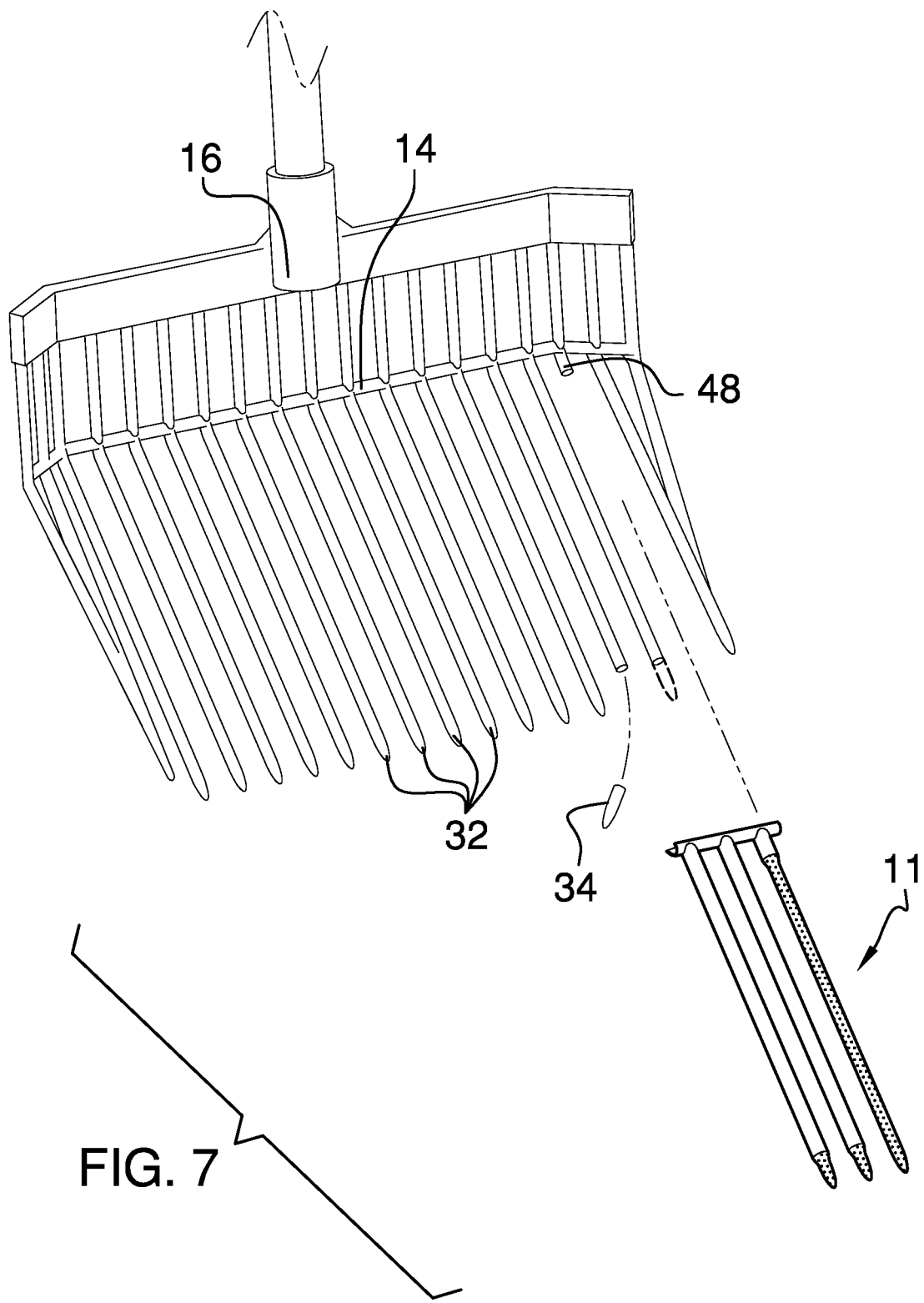
FIG. 7 is an in-use view of an embodiment of the disclosure.

An alternative embodiment of the invention 11 is presented should the broken tine 46 be an outermost pitchfork tine 48 of the plurality of pitchfork tines. As shown in FIGS. 6 and 7, the pair of tine sleeves 24 may be coupled around one of the pair of outer tine apertures 20 and the medial tine aperture 22 and the base portion 42 of the tine spike may be coupled one of the pair of outer tine apertures 20.

In use, the user cuts off the end segment 34 of the pitchfork tines 32 to be inserted into the tine sleeves 24. The base 12 is slid down and adhered to the tine crossbar 14. The pitchfork 16 may then be used normally.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A pitchfork tine replacement apparatus comprising:
    a base, the base being semi-tubular and configured to selectively engage a tine crossbar of a pitchfork, the base having a set of tine apertures extending therethrough;
    at least one tine sleeve coupled to the base, each tine sleeve being hollow and coupled to an outer face of the base, each tine sleeve being coupled around one of the tine apertures, each tine sleeve being configured to receive one of a plurality of pitchfork tines coupled to the tine crossbar of the pitchfork; and
    a tine spike coupled to the base, the tine spike having a hollow base portion coupled to the outer face of the base around one of the tine apertures and a solid spike portion extending from the base portion, the base portion being configured to receive a remnant of a broken tine of the plurality of pitchfork tines, the hollow base portion being wider than the solid spike portion.

2. The pitchfork tine replacement apparatus of claim 1 further comprising the tine sleeves being a pair of tine sleeves.

3. A pitchfork tine replacement apparatus comprising:
    a base, the base being semi-tubular and configured to selectively engage a tine crossbar of a pitchfork, the base having a set of tine apertures extending therethrough;
    at least one tine sleeve coupled to the base, each tine sleeve being hollow and coupled to an outer face of the base, each tine sleeve being coupled around one of the tine apertures, each tine sleeve being configured to receive one of a plurality of pitchfork tines coupled to the tine crossbar of the pitchfork;
    a tine spike coupled to the base, the tine spike having a hollow base portion coupled to the outer face of the base around one of the tine apertures and a solid spike portion extending from the base portion, the base portion being configured to receive a remnant of a broken tine of the plurality of pitchfork tines; and
    each tine sleeve having a hollow body portion and a solid tip portion, the hollow body portion being configured to receive the pitchfork tine once an end segment of the pitchfork tine has been cut off.

4. The pitchfork tine replacement apparatus of claim 3 further comprising the tip portion having a tapered neck section and a pointed head section.

5. A pitchfork tine replacement apparatus comprising:
    a base, the base being semi-tubular and configured to selectively engage a tine crossbar of a pitchfork, the base having a set of tine apertures extending therethrough;
    at least one tine sleeve coupled to the base, each tine sleeve being hollow and coupled to an outer face of the base, each tine sleeve being coupled around one of the tine apertures, each tine sleeve being configured to receive one of a plurality of pitchfork tines coupled to the tine crossbar of the pitchfork, the tine sleeves being a pair of tine sleeves;
    a tine spike coupled to the base, the tine spike having a hollow base portion coupled to the outer face of the base around one of the tine apertures and a solid spike portion extending from the base portion, the base portion being configured to receive a remnant of a broken tine of the plurality of pitchfork tines; and
    the pair of tine sleeves being coupled around a pair of outer tine apertures of the set of tine apertures, the tine spike being coupled between the pair of tine sleeves around a medial tine aperture of the set of tine apertures.

6. A pitchfork tine replacement apparatus comprising:
    a base, the base being semi-tubular and configured to selectively engage a tine crossbar of a pitchfork, the base having a set of tine apertures extending therethrough;
    at least one tine sleeve coupled to the base, each tine sleeve being hollow and coupled to an outer face of the base, each tine sleeve being coupled around one of the tine apertures, each tine sleeve being configured to receive one of a plurality of pitchfork tines coupled to the tine crossbar of the pitchfork, the tine sleeves being a pair of tine sleeves;
    a tine spike coupled to the base, the tine spike having a hollow base portion coupled to the outer face of the base around one of the tine apertures and a solid spike portion extending from the base portion, the base portion being configured to receive a remnant of a broken tine of the plurality of pitchfork tines; and
    the pair of tine sleeves being coupled around one of a pair of outer tine apertures and a medial tine aperture of the set of tine apertures, the tine spike being coupled around one of the pair of outer tine apertures and configured to replace an outermost pitchfork tine of the plurality of pitchfork tines.

7. A pitchfork tine replacement apparatus comprising:

a base, the base being semi-tubular and configured to selectively engage a tine crossbar of a pitchfork, the base having a set of three tine apertures extending therethrough;

at least one tine sleeve coupled to the base, each tine sleeve being hollow and coupled to an outer face of the base, each tine sleeve being coupled around one of the tine apertures, each tine sleeve having a hollow body portion and a solid tip portion, the hollow body portion being configured to receive one of a plurality of pitchfork tines coupled to the tine crossbar of the pitchfork once an end segment of the pitchfork tine has been cut off, the tip portion having a tapered neck section and a pointed head section, the tine sleeves being a pair of tine sleeves coupled around a pair of outer tine apertures of the set of tine apertures; and a tine spike coupled to the base, the tine spike having a hollow base portion and a solid spike portion extending from the base portion, the hollow base portion being wider than the solid spike portion, the base portion being coupled to the outer face of the base between the pair of tine sleeves around a medial tine aperture of the set of tine apertures, the base portion being configured to receive a remnant of a broken tine of the plurality of pitchfork tines.

8. A pitchfork tine replacement apparatus comprising:

a base, the base being semi-tubular and configured to selectively engage a tine crossbar of a pitchfork, the base having a set of three tine apertures extending therethrough;

at least one tine sleeve coupled to the base, each tine sleeve being hollow and coupled to an outer face of the base, each tine sleeve being coupled around one of the tine apertures, each tine sleeve having a hollow body portion and a solid tip portion, the hollow body portion being configured to receive one of a plurality of pitchfork tines coupled to the tine crossbar of the pitchfork once an end segment of the pitchfork tine has been cut off, the tip portion having a tapered neck section and a pointed head section, the tine sleeves being a pair of tine sleeves coupled around one of a pair of outer tine apertures and a medial tine aperture of the set of tine apertures; and a tine spike coupled to the base, the tine spike having a hollow base portion and a solid spike portion extending from the base portion, the hollow base portion being wider than the solid spike portion, the base portion being coupled to the outer face of the base around one of the pair of outer tine apertures, the base portion being configured to receive a remnant of a broken tine of the plurality of pitchfork tines when the broken tine is an outermost pitchfork tine of the plurality of pitchfork tines.

* * * * *